US00RE51074E

(19) United States
(12) Reissued Patent
Park

(10) Patent Number: US RE51,074 E
(45) Date of Reissued Patent: *Oct. 13, 2026

(54) IMAGE PROCESSOR AND DISPLAY SYSTEM HAVING ADAPTIVE OPERATIONAL FREQUENCY RANGE

(71) Applicant: SAMSUNG ELECTRONICS CO., LTD., Suwon-si (KR)

(72) Inventor: Kyung-Min Park, Dong-Gu (KR)

(73) Assignee: Samsung Electronics Co., Ltd., Suwon-si (KR)

( * ) Notice: This patent is subject to a terminal disclaimer.

(21) Appl. No.: 18/121,352

(22) Filed: Mar. 14, 2023

Related U.S. Patent Documents

Reissue of:
(64) Patent No.: 10,319,335
Issued: Jun. 11, 2019
Appl. No.: 15/290,060
Filed: Oct. 11, 2016

U.S. Applications:
(63) Continuation of application No. 17/168,054, filed on Feb. 4, 2021, now Pat. No. Re. 49,524, which is an application for the reissue of Pat. No. 10,319,335.

(30) Foreign Application Priority Data

Oct. 27, 2015 (KR) ..... 10-2015-0149457

(51) Int. Cl.
*G09G 5/36* (2006.01)
*G06T 1/20* (2006.01)
(Continued)

(52) U.S. Cl.
CPC ..... *G09G 5/006* (2013.01); *G06T 1/20* (2013.01); *G09G 3/2096* (2013.01); *G09G 5/363* (2013.01);
(Continued)

(58) Field of Classification Search
CPC .... G09G 5/0006; G09G 5/363; G09G 3/2096; G09G 5/393; G09G 5/395; G06T 1/20
See application file for complete search history.

(56) References Cited

U.S. PATENT DOCUMENTS 7,023,485 B1 4/2006 Sohn
7,755,630 B2 7/2010 Woo
(Continued)

FOREIGN PATENT DOCUMENTS

JP 2001-238190 A 8/2001
JP 2011-238190 8/2001
(Continued)

*Primary Examiner* — Robert L Nasser
(74) *Attorney, Agent, or Firm* — Fish & Richardson P.C.

(57) ABSTRACT

An image processor includes a frame buffer configured to collect an image data of pixels and configured to generate frame data, a display controller configured to generate the frame update command based on a vertical synchronizing signal and a frame per second signal representing a number of activating of the frame update signal in a second and an operating part configured to generate the vertical synchronizing signal and the image data. When the frame data is generated, the frame buffer activates a frame update signal in response to a frame update command and outputs the frame data. When the frame per second signal is less than a predetermined threshold voltage, the operating part sets a lower limit of a range of a frequency to a predetermined minimum frequency.

16 Claims, 10 Drawing Sheets

(51) Int. Cl.

| | |
|---|---|
| ***G09G 3/20*** | (2006.01) |
| ***G09G 5/00*** | (2006.01) |
| ***G09G 5/393*** | (2006.01) |
| ***G09G 5/395*** | (2006.01) |

(52) U.S. Cl.

CPC ..... *G09G 5/393* (2013.01); *G09G 5/395* (2013.01); *G09G 2310/0267* (2013.01); *G09G 2310/027* (2013.01); *G09G 2310/0297* (2013.01); *G09G 2310/08* (2013.01); *G09G 2330/021* (2013.01); *G09G 2340/0435* (2013.01); *G09G 2350/00* (2013.01); *G09G 2360/12* (2013.01); *G09G 2360/18* (2013.01)

(56) References Cited

U.S. PATENT DOCUMENTS

| | | | | |
|---|---|---|---|---|
| 7,986,316 | B2 | 7/2011 | Correa et al. | |
| 8,462,268 | B2 | 6/2013 | Ryan et al. | |
| 8,542,747 | B2 | 9/2013 | Doswald | |
| 8,633,876 | B2 * | 1/2014 | Lee | G09G 3/3233 345/76 |
| 2011/0074800 | A1 * | 3/2011 | Stevens | G06T 11/40 345/545 |
| 2011/0128440 | A1 * | 6/2011 | Koike | G06T 1/00 348/E7.003 |
| 2012/0324248 | A1 * | 12/2012 | Schluessler | G06F 1/3253 713/300 |
| 2014/0016038 | A1 | 1/2014 | Ramaswamy et al. | |
| 2014/0063026 | A1 * | 3/2014 | Oh | G06T 1/20 345/519 |
| 2014/0068285 | A1 * | 3/2014 | Lee | G06F 1/324 713/300 |
| 2014/0184619 | A1 | 7/2014 | Kim | |
| 2014/0223219 | A1 | 8/2014 | Aelion et al. | |
| 2015/0130820 | A1 * | 5/2015 | Shu | G06T 1/20 345/502 |
| 2015/0317762 | A1 * | 11/2015 | Park | G06T 1/20 345/505 |
| 2016/0225348 | A1 * | 8/2016 | Maiya | G09G 5/18 |
| 2017/0053620 | A1 * | 2/2017 | Law | G09G 5/363 |

FOREIGN PATENT DOCUMENTS

| | | |
|---|---|---|
| JP | 2011-113454 | 6/2011 |
| KR | 2015-0019598 A | 2/2015 |

* cited by examiner

| FPS | PU FREQ BOUNDARY |
|---|---|
| ≥ 50(VP) | 0.5GHz ~ 2GHz |
| < 50 | 1GHz(PMF) ~ 2GHz |

FIG. 6

| GPU FREQ (F2) | CPU FREQ (F1) BOUNDARY |
|---|---|
| 600MHz (MAX.) | 2GHz ~ 2GHz |
| 500MHz | 1GHz ~ 2GHz |
| 400MHz | 0Hz ~ 2GHz<br>→1GHz(PMF) ~ 2GHz |
| 300MHz | 0Hz ~ 2GHz |

IMAGE PROCESSOR AND DISPLAY SYSTEM HAVING ADAPTIVE OPERATIONAL FREQUENCY RANGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: more than one reissue application has been filed for the reissue of U.S. Pat. No. 10,319,335. The reissue applications are application Ser. No. 18/121,352 (the present application) and application Ser. No. 17/168,054, of which the present application is a continuation reissue application.*

CROSS-REFERENCE TO RELATED APPLICATION

This application *is an application for reissue of U.S. Pat. No. 10,319,335 which issued on Jun. 11, 2019, and is a continuation of U.S. application Ser. No. 17/168,054 filed Feb. 4, 2021. Said U.S. application Ser. No. 17/168,054 is also an application for reissue of U.S. Pat. No. 10,319,335. Said U.S. Pat. No. 10,319,335 issued from U.S. application Ser. No. 15/290,060 filed Oct. 11, 2016 which* claims priority under 35 USC § 119 to Korean Patent Application No. 10-2015-0149457 filed on Oct. 27, 2015, the subject matter of which is hereby incorporated by reference in its entirety.

BACKGROUND

1. Technical Field

Embodiments of the inventive concept relate generally to methods of performing dynamic voltage and/or frequency scaling ("DVFS"). More particularly, embodiments of the inventive concept relate to image processors capable of dynamically setting a frequency without decreasing a number of frames per second provided by a display system including the image processor.

2. Description of the Related Art

Many contemporary display systems provide visual images at a rate (or frequency) of sixty (60) frames per second (FPS), or one frame about every 16 ms. This rate of image frame provision is above the rate necessary for a human viewer of the image to distinguish discrete frames. If frame data is not generated at the foregoing rate, the display apparatus may not display (or omit) the frame data. This is called frame drop.

Those skilled in the art will appreciate that there are many different types of display apparatuses including one or more image processors. However, each one of the variety of display apparatuses typically includes circuitry capable of generating a control signal known as the vertical synchronizing signal (VSYNC) as well as a video data signal (e.g., a RGB data signal (RD)). Hereafter, such circuitry and/or related control software will be generally referred to as an "operating part" of the display apparatus. In this context, the phenomenon of frame drop may cause the operating part to operate in an idle state, such that the frequency of the operating part decreases under the control of a constituent method that sets the dynamic frequency of the display apparatus. As a result of this undesired decrease, additional frame drops may occur until the frequency of the operating part decreases in a manner that results in a low frame rate for the display apparatus.

SUMMARY

Accordingly, the inventive concept is provided to substantially obviate one or more problems due to limitations and disadvantages of the related art.

Some exemplary embodiments provide an image processor setting a lower limit of a range of a frequency not to decrease the number of frames in a second under a predetermined value.

Some exemplary embodiments provide a display system setting a lower limit of a range of a frequency not to decrease the number of frames in a second under a predetermined value.

According to exemplary embodiments, an image processor includes a frame buffer configured to collect an image data of pixels and configured to generate frame data, a display controller configured to generate the frame update command based on a vertical synchronizing signal and a frame per second signal representing a number of activating of the frame update signal in a second and an operating part configured to generate the vertical synchronizing signal and the image data. When the frame data is generated, the frame buffer activates a frame update signal in response to a frame update command and outputs the frame data. When the frame per second signal is less than a predetermined threshold voltage, the operating part sets a lower limit of a range of a frequency to a predetermined minimum frequency.

In an exemplary embodiment, when the frame per second signal is equal to or greater than the predetermined threshold voltage, the operating part may initiate the lower limit of the range of the frequency.

In an exemplary embodiment, the operating part may adjust the frequency based on a usage of the operating part. The usage of the operating part may represent a number of instructions processed by the operating part.

In an exemplary embodiment, the operating part may include a central processing unit, a graphic processing unit and a multiplexer, the central processing unit comprising a frequency controller. The multiplexer may be configured to output one of first data and second data as the image data based on a control signal, the first data being generated by the central processing unit, the second data being generated by the graphic processing unit, and the control signal being generated by the central processing unit. The frequency controller may be configured to generate a first frequency control signal and a second frequency control signal based on the frame per second signal. The central processing unit may be configured to change a first frequency according to the first frequency control signal and the graphic processing unit is configured to change a second frequency according to the second frequency control signal.

In an exemplary embodiment, the frequency controller may be configured to adjust the first frequency control signal based on a first usage representing a number of instructions processed by the central processing unit. The frequency controller may be configured to adjust the second frequency control signal based on a second usage representing a number of instructions processed by the graphic processing unit.

In an exemplary embodiment, the frequency controller may be configured to set a lower limit of a range of the first frequency based on the second frequency.

In an exemplary embodiment, when the frame per second signal is less than the predetermined threshold voltage, the lower limit of the range of the first frequency may be set to the predetermined minimum frequency.

In an exemplary embodiment, when the frame per second signal is equal to or greater than the predetermined threshold voltage, the lower limit of the range of the first frequency may be initiated.

In an exemplary embodiment, when the central processing unit generates the image data, the central processing unit generates the first data, the central processing unit activates the control signal and the multiplexer outputs the first data as the image data. When the graphic processing unit generates the image data, the graphic processing unit outputs the second data in response to an instruction generated by the central processing unit, the central processing unit deactivates the control signal, and the multiplexer outputs the second data as the image data.

In an exemplary embodiment, the central processing unit may be configured to activate the vertical synchronizing signal in a cycle.

In an exemplary embodiment, the cycle may be 1/60 second.

In an exemplary embodiment, when the frame update command is applied and the frame data is generated, the frame buffer may activate the frame update signal and the display controller may increase the frame per second signal.

In an exemplary embodiment, when the frame update command is applied and the frame data is not generated, the frame buffer may deactivate the frame update signal and the display controller may not increase the frame per second signal.

According to exemplary embodiments, a display system includes an image processor, a timing controller, a display panel, a data driver and a scan driver. The image processor is configured to generate frame data and to set a lower limit of a range of a frequency to a predetermined minimum frequency based on a number of updating of the frame data in a second. The timing controller is configured to generate a data driver control signal and a scan driver control signal based on the frame data. The display panel includes a plurality of pixels. The data driver is configured to generate a plurality of data signals based on the data driver control signal and to output the data signals to the pixels through a plurality of data signal lines. The scan driver is configured to generate a plurality of scan signals based on the scan driver control signal and to output the scan signals to the pixels through a plurality of scan signal lines.

In an exemplary embodiment, the image processor may include a frame buffer configured to collect an image data of pixels and configured to generate the frame data, a display controller configured to generate the frame update command based on a vertical synchronizing signal and a frame per second signal representing a number of activating of the frame update signal in a second and the number of updating of the frame data in a second and an operating part configured to generate the vertical synchronizing signal and the image data. When the frame data is generated, the frame buffer activates a frame update signal in response to a frame update command and outputs the frame data. When the frame per second signal is less than a predetermined threshold voltage, the operating part sets the lower limit of the range of the frequency to the predetermined minimum frequency.

In an exemplary embodiment, a system includes a Central Processing Unit (CPU) that receives a frame per second signal indicating a number per second of frame update signal activations, operates in response to a first frequency, and generates a vertical synchronizing signal, a control signal and first data signal, a Graphics Processing Unit (GPU) that operates in response to a second frequency and generates a second data signal, and a multiplexer that receives the first data signal, the second data signal and the control signal, and selectively outputs either the first data signal or the second data signal is response to the control signal. The CPU includes a frame buffer that activates a frame update signal in response to a frame update command and outputs the frame data and a display controller that generates the frame update command based on the vertical synchronizing signal and the frame per second signal, wherein when the frame per second signal is less than a predetermined threshold voltage, the CPU sets a lower limit of a range of a frequency to a predetermined minimum frequency.

According to the image processor and the display system including the image processor, in a locking state in which both a frame velocity and a frequency of the operating part decrease, the lower limit of the range of the frequency is set to a predetermined minimum frequency so that the number of frames in a second may be maintained to be equal to or greater than a predetermined value.

BRIEF DESCRIPTION OF THE DRAWINGS

Illustrative, exemplary embodiments will be more clearly understood from the following detailed description taken in conjunction with the accompanying drawings.

FIG. 6 is a table illustrating the operation of the operating part of FIG. 4.

DETAILED DESCRIPTION

Various exemplary embodiments will be described more fully with reference to the accompanying drawings. The inventive concept may, however, be embodied in many different forms and should not be construed as limited to only the illustrated embodiments set forth herein. Rather, these embodiments are provided so that this disclosure will be thorough and complete, and will fully convey the scope of the inventive concept to those skilled in the art. Throughout the written description and drawings, like reference numbers and labels are used to denote like or similar elements.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
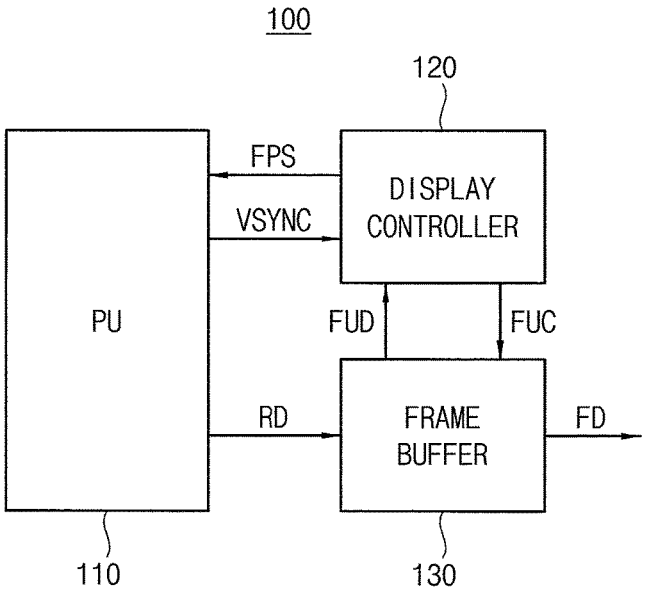
FIG. 1 is a block diagram illustrating an image processor according to an exemplary embodiment.

FIG. 1 is a block diagram illustrating an image processor according to an exemplary embodiment. Referring to FIG. 1, the image processor 100 includes a frame buffer 130, a display controller 120 and an operating part (PU) 110.

The frame buffer 130 collects image data (e.g. RGB data) of the pixels and generates frame data FD. When the RGB data are collected corresponding to a size of the frame, the frame data FD is generated. When the frame data FD is generated, the frame buffer 130 activates a frame update signal FUD in response to a frame update command and outputs the frame data FD. A display panel (not shown) receives the frame data FD and displays an image corresponding to the frame data FD. When the frame data FD is not generated, the frame buffer 130 deactivates the frame update signal FUD in response to the frame update command and does not output the frame data FD, and the display panel maintains the image corresponding to the frame data FD of the previous frame.

The display controller 120 generates the frame update command FUC based on a vertical synchronizing signal VSYNC. The display controller 120 generates a frame per second signal FPS indicating a number per second of activations by the frame update signal FUD. In certain embodiments, the vertical synchronizing signal VSYNC will have an activation period (or cycle) of 1/60 second. The provision and use of the vertical synchronizing signal VSYNC, as a control signal, is well known to persons skilled in the art, and thus a detailed explanation of the vertical synchronizing signal VSYNC is omitted.

When the frame update command FUC is applied and the frame data FD is generated, the frame buffer 130 activates the frame update signal FUD and the display controller 120 increase the frame per second signal FPS. In contrast, when the frame update command FUC is applied and the frame data FD is not generated, the frame buffer 130 deactivates the frame update signal FUD and the display controller 120 may not increase the frame per second signal FPS.

In the illustrated example of FIG. 1, it is assumed that the operating part 110 is able to adjust its operating frequency based on actual operation (or usage) of the operating part 110. Here, the term "usage" of the operating part 110 may mean a number of instructions successfully processed by the operating part 110. In this regard, the operating part 110 may use some form of dynamic voltage and frequency scaling (a DVFS method). Using the DVFS method, the frequency of the operating part 110 may be dynamically adjusted based on the usage of the operating part 110.

As described previously, the operating part 110 is assumed to generate the vertical synchronizing signal VSYNC and image data signal (RD) (e.g., a RGB data signal). When the frame per second signal FPS is less than a predetermined threshold value, the operating part 110 sets a lower limit on the range of the frequency to the predetermined minimum frequency. When the frame per second signal FPS is greater than or equal to the predetermined threshold value, the operating part 110 may initiate the lower limit on the range of the frequency.

Figure 2:
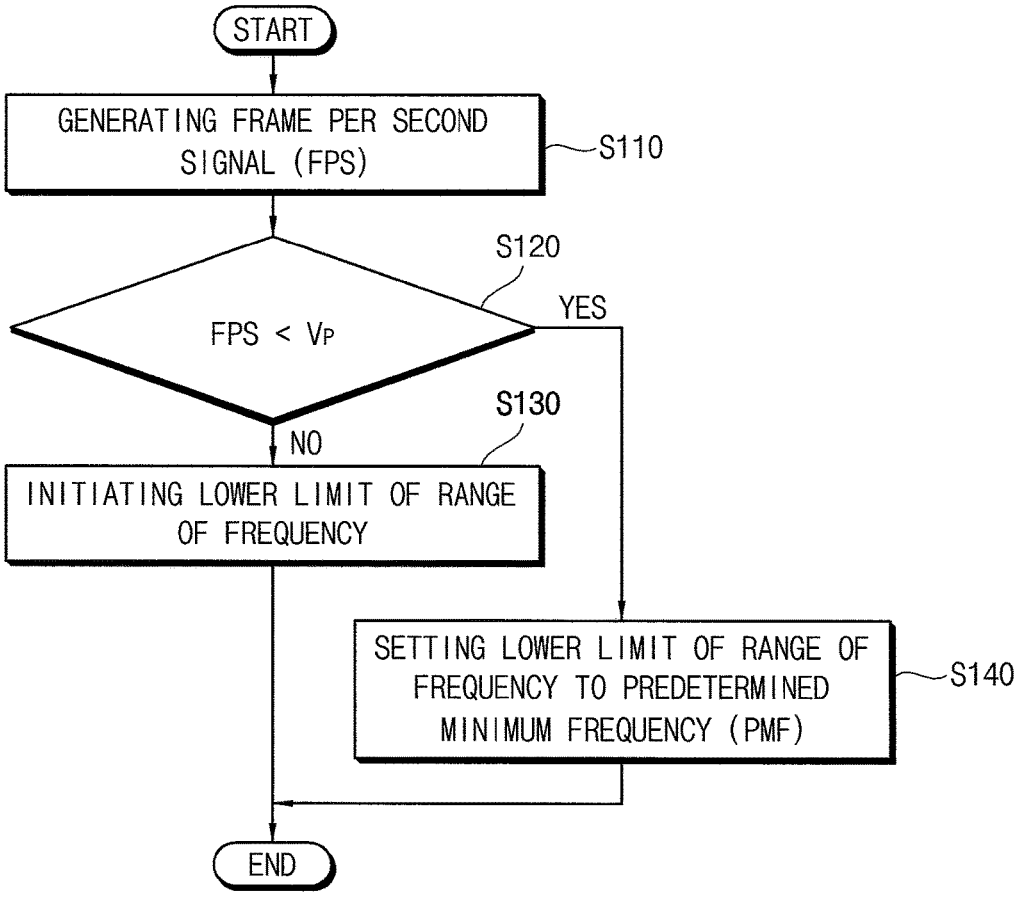
FIG. 2 is a flow chart illustrating an operation of an operating part of the image processor of FIG. 1.

In this regard, FIG. 2 is a flow chart further illustrating operation of the operating part 110 of the image processor 100 of FIG. 1.

Referring to FIGS. 1 and 2, the display controller 120 may be used to count a number per second of frame update signal FUD activations in order to generate the frame per second signal FPS (S110). The operating part 110 then compares the generated frame per second signal FPS to a predetermined threshold value $V_P$ (S120).

If the frame per second signal FPS is less than the predetermined threshold value $V_P$ (S120=YES), the operating part 110 sets the lower limit of the range of the frequency of the operating part 110 to the predetermined minimum frequency PMF (S140). When both the frame velocity and frequency of the operating part 110 decrease, the image processor 100 may become locked (i.e., stuck in an idle state, hereafter referred to as a "locking state"). However, according to certain embodiments of the inventive concept, the frequency of the operating part 110—which is set to at least the predetermined minimum frequency PMF—will not become locked.

In the foregoing, the predetermined threshold value $V_P$ may be set by a user. In an exemplary embodiment, when a high frame velocity is desired in spite of high power consumption, the predetermined threshold value $V_P$ may be set to a value close to about 60 FPS. Alternately, if a low frame velocity is desired to reduce overall power consumption, the predetermined threshold value $V_P$ may be set to a value much less than 60 FPS.

When the frame per second signal FPS is greater than or equal to the predetermined threshold value $V_P$ (S120=NO), the operating part 110 initiates the lower limit of the range of the frequency of the operating part 110 (S130), because the operating part 110 is not in the locking state so that the lower limit of the range of the frequency of the operating part 110 may be back to an original value.

The image processor 100 may operate according to the method illustrated in FIG. 2 according to a defined cycle (e.g., 1 second, 500 ms, 250 ms, etc.). The range of the frequency of the operating part 110, as defined by the method of FIG. 2, may thus be applied to the operating part 110 during a "next cycle" (i.e., a cycle following the current cycle).

Figures 3, 4:
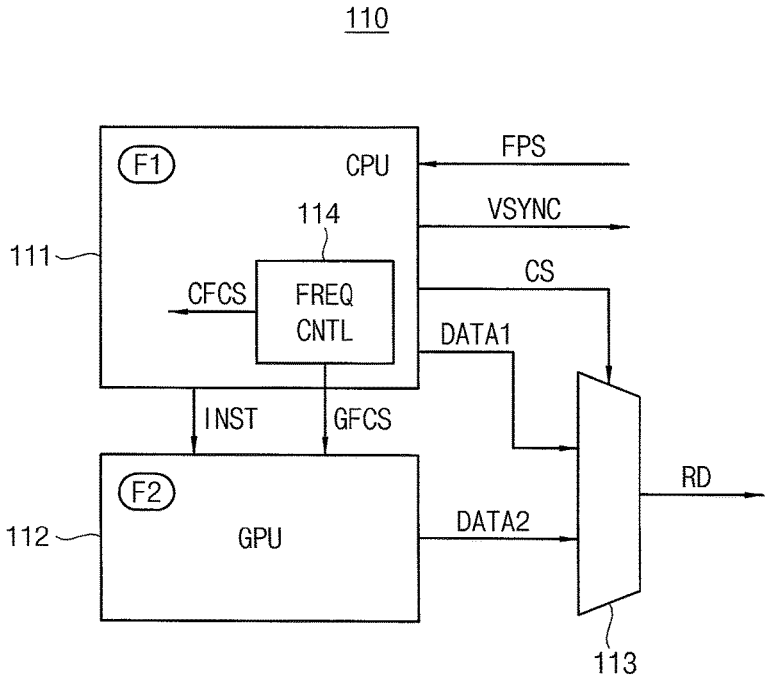
FIG. 3 is a table illustrating the operation of the operating part of the image processor of FIG. 1.
FIG. 4 is a block diagram illustrating an example of an operating part of the image processor of FIG. 1.

FIG. 3 is a table further illustrating operation of the operating part of the image processor of FIG. 1.

In FIG. 3, it is assumed that the predetermined threshold value $V_P$ is 50 FPS, and that the minimum frequency of the operating part 110 is 1 GHz. Thus, so long as the frame per second signal FPS is greater than or equal to 50 FPS, the frequency of the operating part 110 may be varied across a (first) range of (e.g.,) 0.5 GHz and 2 GHz. However, if the frame per second signal FPS falls below 50 FPS, the frequency of the operating part 110 may be varied across a (second) range of (e.g.,) 1 GHz and 2 GHz.

Figure 5:
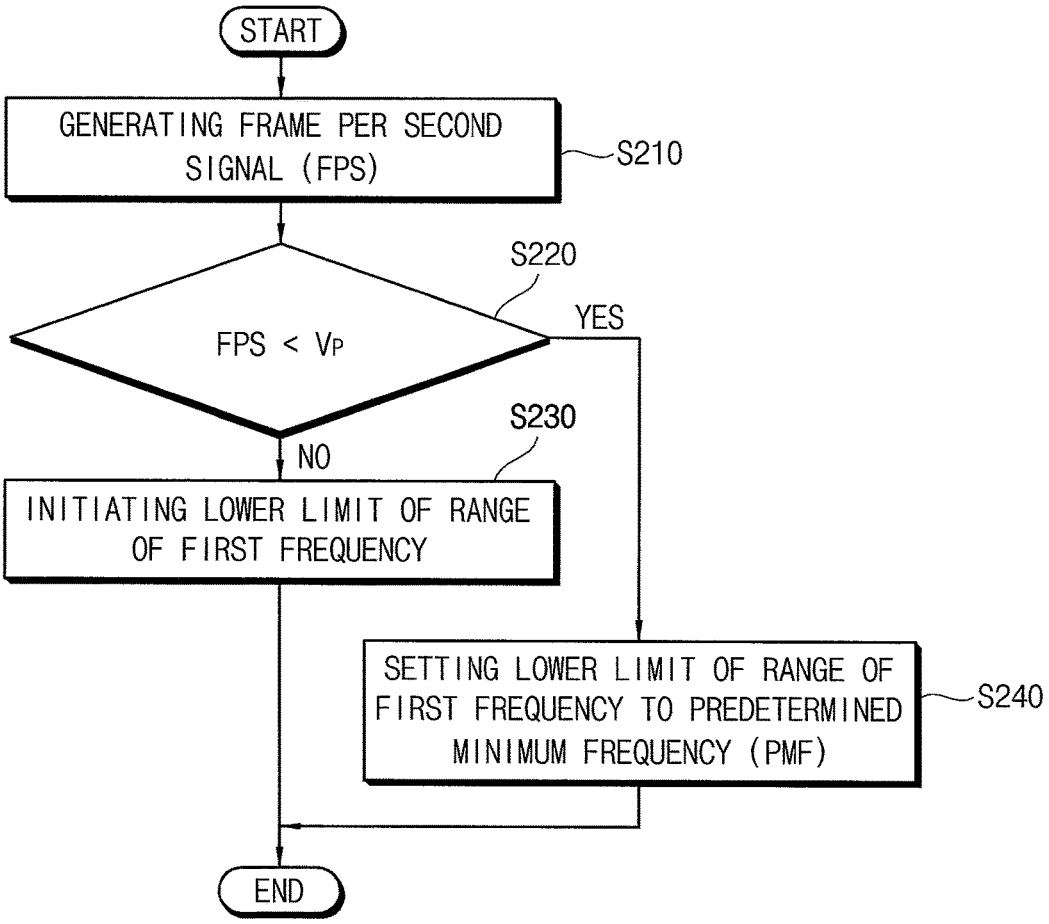
FIG. 5 is a flow chart illustrating an operation of the operating part of FIG. 4.

FIG. 4 is a block diagram illustrating in one example the operating part 110 of the image processor of FIG. 1. FIG. 5 is a flow chart illustrating operation of the operating part 100 of FIG. 4, and FIG. 6 is a table further illustrating operation of the operating part 110 of FIG. 4.

Referring to FIG. 4, the operating part 110 may include a frequency controller 114, a central processing unit ("CPU") 111, a graphic processing unit ("GPU") 112 and a multiplexer 113.

In an exemplary embodiment, the CPU 111 may be a general purpose processor capable of executing various kinds of tasks (instructions). In an exemplary embodiment, the GPU 112 may be a processor dedicated to the generation and/or acceleration of tasks related to visual graphics.

The multiplexer 113 may be used to output one of a first data signal DATA1 received from the CPU 111 or a second data signal DATA2 in response to a control signal CS generated by the CPU 111. Here, the first and second data signals DATA1 and DATA2 may be respective RGB data signals selected by the state (activated/deactivated) of the control signal CS as the output image data RD of multiplexer 113.

The frequency controller 114 may be used to generate a first frequency control signal CFCS and a second frequency control signal GFCS based on the frame per second signal FPS. The CPU 111 may vary a first frequency F1 according to the first frequency control signal CFCS, and the GPU 112 may vary a second frequency F2 according to the second frequency control signal GFCS.

The frequency controller 114 may adjust the first frequency control signal CFCS based on a first usage indicated by the number of the instructions processed by the CPU 111. When the first usage increases, the frequency controller 114 may adjust the first frequency control signal CFCS to increase the first frequency F1 so that the number of the instructions processed by the CPU 111 increases relative to a specific time duration. When the first usage decreases, the frequency controller 114 may adjust the first frequency control signal CFCS to decrease the first frequency F1 so that the number of the instructions processed by the CPU 111 decreases relative to the specific time duration. In this manner, power consumption by the display system may be better optimized in relation to actual usage.

The frequency controller 114 may adjust the second frequency control signal GFCS based on a second usage indicated by a number of the instructions processed by the GPU 112. When the second usage increases, the frequency controller 114 may adjust the second frequency control signal GFCS to increase the second frequency F2 so that the number of the instructions processed by the GPU 112 increases relative to a specific time duration. When the second usage decreases, the frequency controller 114 may adjust the second frequency control signal GFCS to decrease the second frequency F2 so that the number of the instructions processed by the GPU 121 decreases relative to the specific time duration. Here again, power consumption by the display system is better optimized.

In an exemplary embodiment, the frequency controller 114 may set a lower limit of a range of a first frequency F1 based on the second frequency F2. Referring to FIG. 6 and assuming that the second frequency F2 is 600 MHz, the frequency controller 114 may set the first frame to 2 GHz. When the second frequency F2 is 500 MHz, the frequency controller 114 may set the first frame between 1 GHz and 2 GHz. When the second frequency F2 is 400 MHz, the frequency controller 114 may set the first frame between 0 Hz and 2 GHz, and when the second frequency F2 is 430 MHz, the frequency controller 114 may set the first frame between 0 Hz and 2 GHz. The table in FIG. 6 illustrates an example of the frequency controller 114 setting a lower limit of the range of the first (GPU) frequency F1 based on a second (GPU) frequency F2. However, FIG. 6 is just an illustrative example.

Consistent with the foregoing, when the frame per second signal FPS is less than the predetermined threshold value $V_P$, the frequency controller 114 sets the lower limit of the range of the first frequency F1 to the predetermined minimum frequency PMF. In an exemplary embodiment, as shown in FIG. 6, when the second frequency F2 is 400 MHz and the frame per second FPS is less than the predetermined threshold value $V_P$, the frequency controller 114 may set the lower limit of the range of the first frequency F1 to the predetermined minimum frequency PMF of 1 GHz. In this case, the first frequency F1 may be changed between 1 GHz and 2 GHz by the frequency controller 114. When the frame per second FPS is equal to or greater than the predetermined threshold value $V_P$, the frequency controller 114 initiates the lower limit of the range of the first frequency F1. As shown in FIG. 6, when the second frequency F2 is 400 MHz and the frame per second FPS gets equal to or greater than the predetermined threshold value $V_P$, the frequency controller 114 may initiate the lower limit of the range of the first frequency F1 to 0 Hz.

In an exemplary embodiment, when the second frequency F2 is 300 MHz and the frame per second FPS is less than the predetermined threshold value $V_P$, the frequency controller 114 may set the lower limit of the range of the first frequency F1 to the predetermined minimum frequency PMF of 1 GHz. When the second frequency F2 is 300 MHz and the frame per second FPS gets equal to or greater than the predetermined threshold value $V_P$, the frequency controller 114 may initiate the lower limit of the range of the first frequency F1 to 0 Hz.

In an exemplary embodiment, the CPU 111 may activate the vertical synchronizing signal VSYNC in a cycle (e.g. 1/60 second).

Referring to FIGS. 4, 5 and 6, the display controller 120 generates the frame per second signal FPS (S210). The frame per second signal FPS is a number per second of frame update signal FUD activations. The frequency controller 114 compares the frame per second signal FPS to the predetermined threshold value $V_P$ (S220).

When the frame per second signal FPS is less than the predetermined threshold value $V_P$ (S220=YES), the frequency controller 114 sets the lower limit of the range of the first frequency of the CPU 111 to the predetermined minimum frequency PMF (S140). The lower limit of the range of the first frequency of the CPU 111 may correspond to (i.e., may be defined in relation to) the second frequency F2 of the GPU 112. When the second frequency F2 decreases, the first frequency F1 decreases. When both the frame velocity and the first frequency F1 of the CPU 111 corresponding to the second frequency F2 of the GPU 112 decrease, the image processor 100 may enter the locking state. Accordingly, the first frequency F1 of the CPU 111 is set to the predetermined minimum frequency PMF so that the locking state may be unlocked.

The predetermined threshold value VP may be set by a user. In an exemplary embodiment, when a high frame velocity is desired in spite of high power consumption, the predetermined threshold value VP may be set to a value close to about 60 FPS. In an exemplary embodiment, when a low frame velocity to reduce the power consumption is desired, the predetermined threshold value VP may be set to a value much less than 60 FPS.

When the frame per second signal FPS is greater than or equal to the predetermined threshold value $V_P$ (S220=NO), the frequency controller 114 initiates the lower limit of the range of the first frequency F1 of the CPU 111 corresponding to the second frequency F2 of the GPU 112 (S230). When the frame per second signal FPS is greater than or equal to the predetermined threshold value $V_P$ (S220=NO), the CPU 111 is not in the locking state so that the lower limit of the range of the first frequency F1 of the CPU 111 may be back to an original value.

The image processor 100 of FIGS. 1 and 4 may operate according to the method described in relation to FIGS. 5 and 6 in a predetermined cycle (e.g., 1 second, 500 Ms, 250 ms, etc.). The range of the first frequency F1 of the CPU 111, as varied by the method of FIG. 5, may be applied to the CPU 111 in a next cycle.

Figure 7:
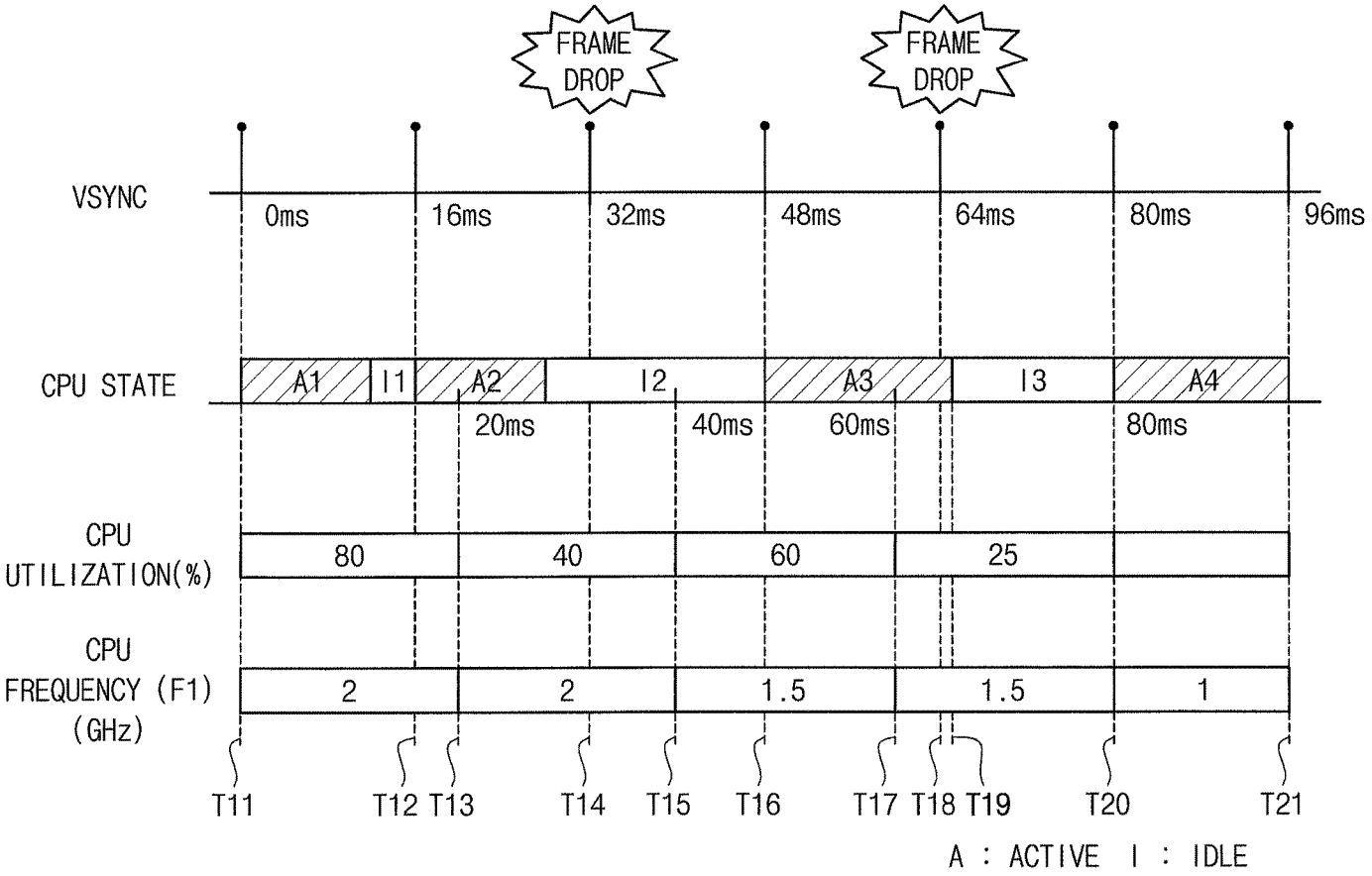
FIG. 7 is a timing diagram illustrating frame drop in an image processor.

FIG. 7 is a timing diagram further illustrating the frame drop phenomenon that may occur in an image processor. In FIG. 7, a processor is assumed to include the operating part 110 of FIG. 4, where the operating part 110 includes the frequency controller 114, the frequency controller 114 operates generally according to the table in FIG. 6, but the lower limit of the range of the first frequency F1 is fixed.

In FIG. 7, the vertical synchronizing signal VSYNC may be activated about every 16 ms (or 1/60 of a second), the frequency controller 114 may set the first frequency F1 every 20 ms. In FIG. 7, the first frequency F1 of the CPU 111 may have the first frequency F1 which is one of four steps of 2 GHz, 1.5 GHz, 1 GHz and 0.5 GHz. In FIG. 7, when the first usage of the CPU 111 exceeds 85%, the first the frequency controller 114 may increase one step of the first frequency F1. When the first usage of the CPU 111 is greater than or equal to 50% but less than 85%, the first the frequency controller 114 maintains the first frequency F1. When the first usage of the CPU 111 fall below 50%, the first the frequency controller 114 may decrease one step of the first frequency F1.

Between a first time T11 and a second time T12, the CPU 111 processes first frame data displayed on the display panel at the second time T12 during a first active duration A1. The CPU 111 does not process operations during a first idle duration H. The GPU 112 stores the first frame data to the frame buffer 130 before the second time T12. The display panel displays an image corresponding to the first frame data at the second time T12.

Between the second time T12 to a fourth time T14, the CPU 111 processes second frame data displayed on the display panel at the fourth time T14 during a second active duration A2. The CPU 111 does not process operations during a second idle duration 12. When the GPU 112 does not store the second frame data to the frame buffer 130 before the second time T14 due to increase of an amount of operations. The display panel does not display an image corresponding to the second frame data at the fourth time T14 so that a frame drop is occurred.

The frequency controller 114 determines the first usage during the period between the first time T11 and a third time T13 as 80%. The frequency controller 114 maintains the first frequency F1 at 2 GHz during the period between the third time T13 to a fifth time T15—the same as the first frequency F1 during the period between the first time T11 to the third time T13.

During the second idle time 12, the GPU 112 completes the second frame data and stores the second frame data to the frame buffer 130. The display panel outputs an image corresponding to the second frame data at a sixth time T16. Between the fourth time T14 and the sixth time T16, the CPU 111 does not process operations.

The frequency controller 114 determines the first usage during a period between the third time T13 and the fifth time T15 as 40%. The frequency controller 114 sets the first frequency F1 to 1.5 GHz during the period between the fifth time T15 to a seventh time T17 which is decreased in the working example by one step from 2 GHz during the period between the third time T13 to the fifth time T15.

Between the sixth time T16 to an eighth time T18, the CPU 111 does not complete processing of the fourth frame data displayed on the display panel at the eighth time T18 before the eighth time T18. Thus, the display panel does not display an image corresponding to the fourth frame data at the eighth time T18 such that a frame drop occurs.

The frequency controller 114 determines the first usage during the period between the fifth time T15 and the seventh time T17 as 60%. The frequency controller 114 maintains the first frequency F1 at 1.5 GHz during the period between the seventh time T17 to a tenth time T20—the same as the first frequency F1 during the period between the fifth time T15 to the seventh time T17.

During a third idle time 13, the CPU 111 completes the process of the fourth frame data. The display panel outputs an image corresponding to the fourth frame data which is stored to the frame buffer 130 by the GPU 112 at the tenth time T20. Between a ninth time T19 and the tenth time T20, the CPU 111 does not process operations.

The frequency controller 114 determines the first usage during a period between the seventh time T17 and the tenth time T20 as 25%. The frequency controller 114 sets the first frequency F1 of the CPU 111 to 1 GHz during the period between the tenth time T20 to an eleventh time T21 which in the working example is decreased by one step from 1.5 GHz during the period between the seventh time T17 to the tenth time T20.

As explained above, in the image processor, the frame velocity is decreased due to the frame drops so that the first frequency F1 also decreases. Thus, the image processor may operate in the locking state.

Figure 8:
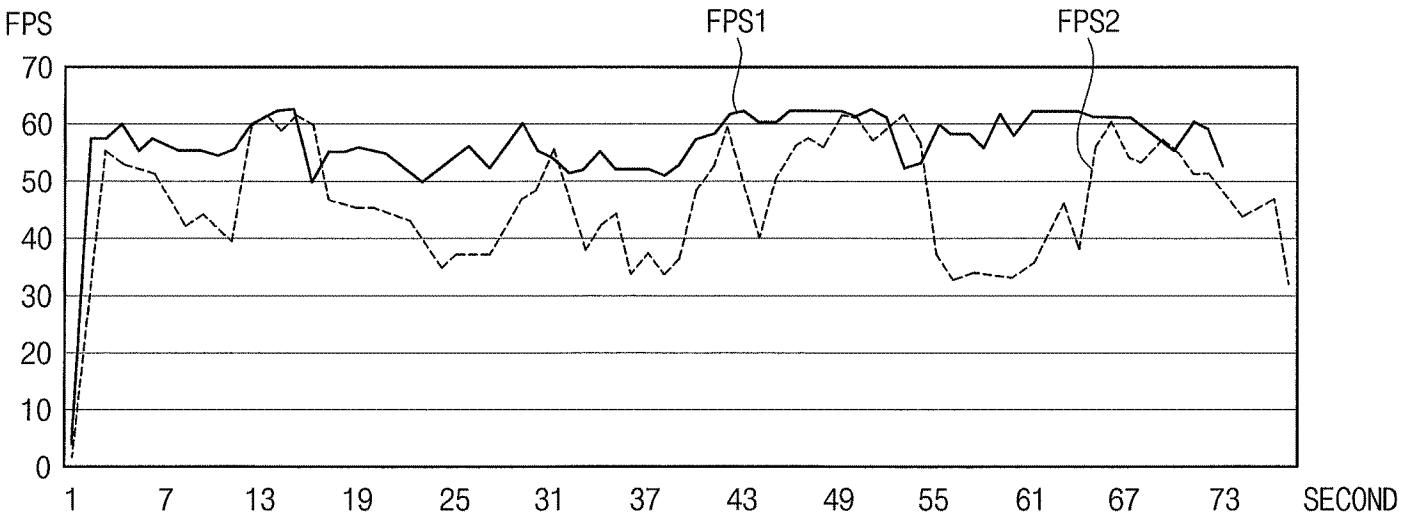
FIG. 8 is a graph illustrating a frame velocity maintained by the image processor of FIG. 1.

FIG. 8 is a graph illustrating a frame velocity maintained by the image processor of FIG. 1.

Referring to FIG. 8, the image processor 100 may set the lower limit of the range of the first frequency F1 to the predetermined minimum frequency PMF so that the image processor 100 may be unlocked from the locking state. In FIG. 8, the image processor 100 according to the present inventive concept has a first frame velocity FPS1 which is higher than a second frame velocity FPS2 of the conventional image processor.

Figure 9:
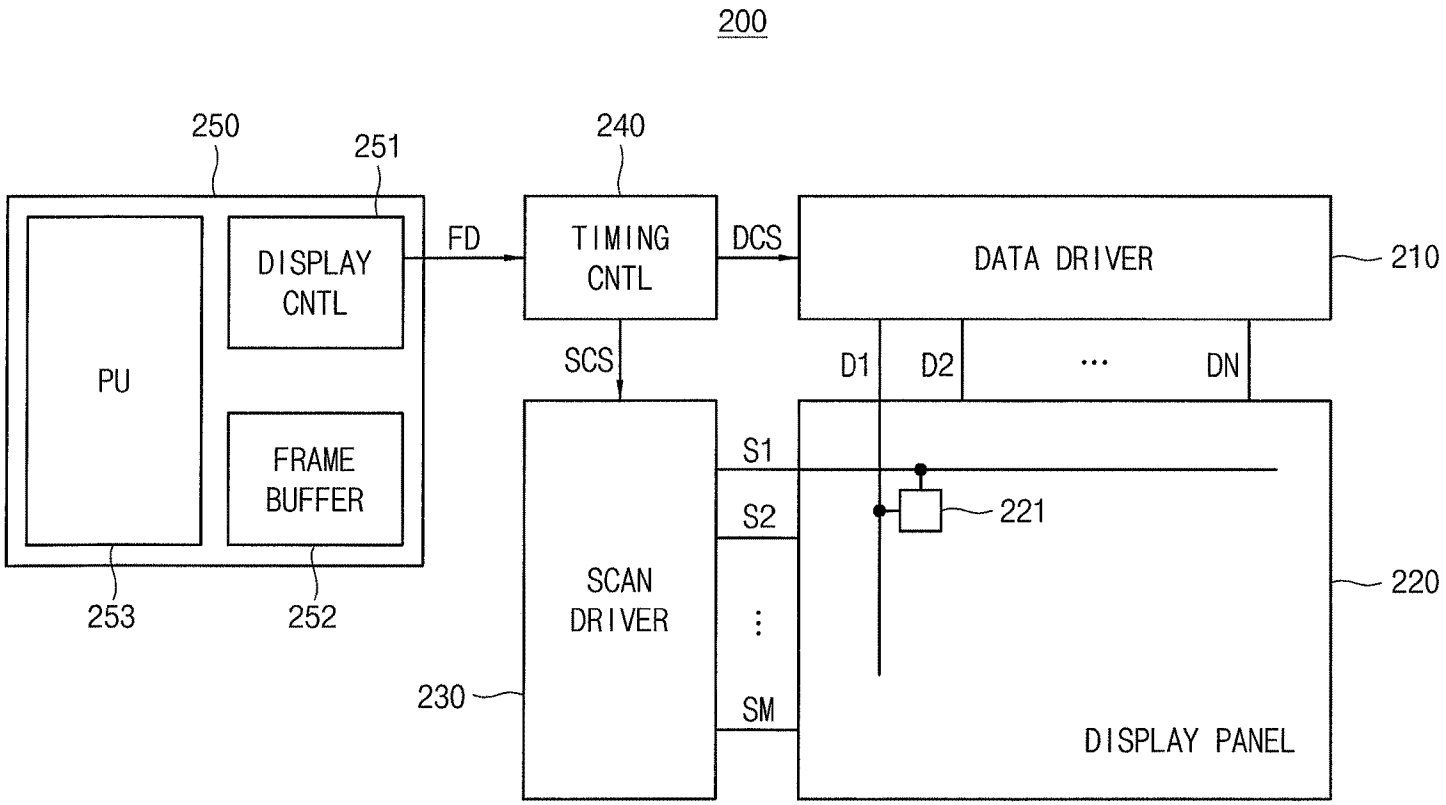
FIG. 9 is a block diagram illustrating a display system according to an exemplary embodiment.

FIG. 9 is a block diagram illustrating a display system according to an exemplary embodiment.

Referring to FIG. 9, the display system 200 includes an image processor 250, a timing controller (TIMING CNTL) 240, a display panel 220, a data driver 210 and a scan driver 230.

The image processor 250 generates the frame data FD, the lower limit of the range of the frequency is set to the predetermined minimum frequency based on the number of frames per second of the frame data FD. The timing controller 240 generates a data driver control signal DCS and a scan driver control signal SCS based on the frame data FD. The display panel 220 includes a plurality of pixels 221. The data driver 210 generates a plurality of data signals based on the data driver control signal DCS and provides the data signals to the pixels 221 through a plurality of data signal lines D1, D2, . . . , DN. The scan driver 230 generates a plurality of scan signals based on the scan driver control signal SCS and provides the scan signals to the pixels 221 through a plurality of scan signal lines S1, S2, . . . , SM.

The image processor 250 may include a frame buffer 252, a display controller (DISPLAY CNTL) 251 and an operating part (PU) 253. The frame buffer 252 collects RGB data of the pixels and generates frame data FD. When the RGB data are collected corresponding to a size of the frame, the frame data FD is generated. When the frame data FD is generated, the frame buffer 252 may activate a frame update signal in response to a frame update command and may output the frame data FD. The display controller 251 may generate the frame update command based on a vertical synchronizing signal. The display controller 251 may generate a frame per second signal representing the number of the activating of the frame update signal in a second and the number of the updating of the frame data FD. The operating part 253 may generate the vertical synchronizing signal and a RGB data signal. When the frame per second signal is less than a predetermined threshold value, the operating part 253 sets the lower limit of the range of the frequency to the predetermined minimum frequency. When the frame per second signal is greater than or equal to the predetermined threshold value, the operating part 253 may initiate the lower limit of the range of the frequency.

When the frame update command is applied and the frame data FD is generated, the frame buffer 252 may activate the frame update signal, the display controller 251 may increase the frame per second signal and the display panel 220 may update the output image using the frame data FD. When the frame update command is applied and the frame data FD is not generated, the frame buffer 252 may deactivate the frame update signal, the display controller 251 may not increase the frame per second signal FPS and the display panel 220 may not update the output image but maintain the output image.

The image processor 250 may have substantially the same structure as the image processor 100 in FIG. 1 or 4, such that the structure and operation of the image processor 250 may be understood from the foregoing description presented in relation to FIGS. 1 through 8. Thus, a detailed explanation regarding the image processor 250 is omitted.

Figure 10:
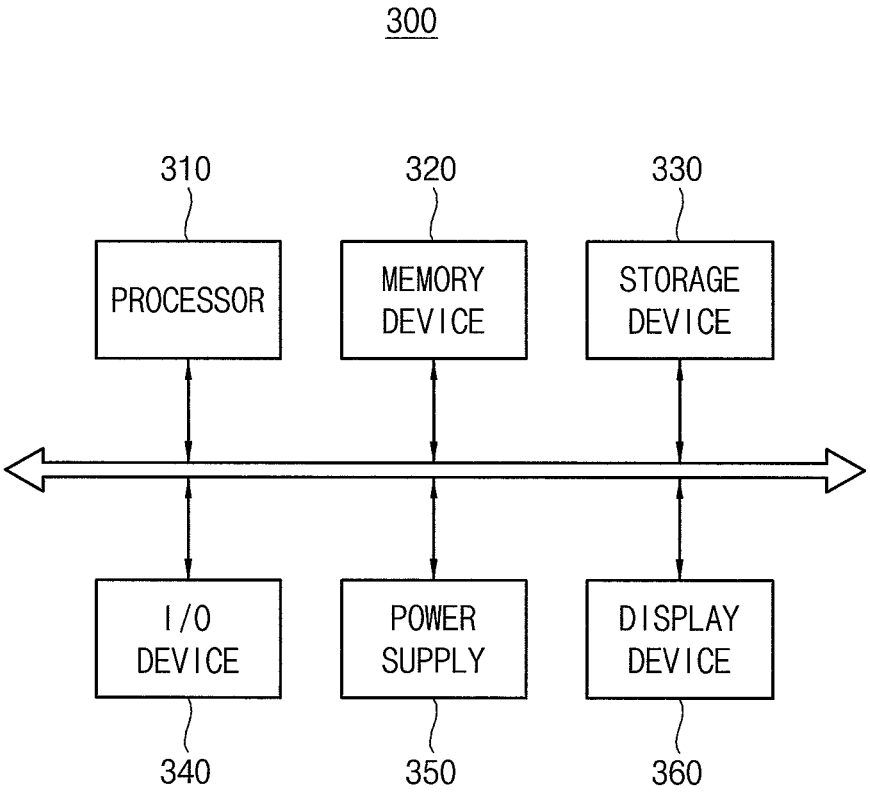
FIG. 10 is a block diagram illustrating an electronic device including the display system according to an exemplary embodiment.

FIG. 10 is a block diagram illustrating an electronic device including the display system according to an exemplary embodiment.

Referring to FIG. 10, the electronic device 300 includes a processor 310, a memory device 320, a storage device 330, an input/output (I/O) device 340, a power supply 350 and a display device 360. The electronic device 300 may further include ports that communicate with a video card, a sound card, a memory card, a universal serial bus (USB) device, or other electronic systems. The electronic device 300 may be a smartphone but the electronic device 300 may not be limited thereto.

The processor 310 may perform various calculations or tasks. According to example embodiments, the processor 310 may be a microprocessor or a central processing unit (CPU). The processor 310 may communicate with the other elements via an address bus, a control bus, and/or a data bus. In some example embodiments, the processor 310 may be coupled to an extended bus, such as a peripheral component interconnection (PCI) bus.

The memory device 320 may store data for operating the electronic device 300. For example, the memory device 320 may be implemented with at least one nonvolatile memory device, e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device, e.g., a dynamic random access memory (DRAM) device, a static random access memory (SRAM) device, a mobile DRAM, etc.

The storage device 330 may include a solid state drive (SSD), a hard disk drive (HDD), a CD-ROM, etc. The I/O device 340 may include an input device (e.g., a keyboard, a keypad, a touch pad, a touch screen, a mouse, etc.) and an output device (e.g., a speaker, a printer, etc.). The power supply 350 may supply operation voltages for the electronic device 300. The display device 360 may be connected to other elements via the buses or communication links.

The processor 310 may correspond to the operating part 253 of FIG. 9. The display device 360 may correspond to the display controller 251, the frame buffer 252, the timing controller 240, the display panel 220, the data driver 210 and the scan driver 230.

In some exemplary embodiments, the electronic device 300 may be any electronic device such as a digital television, a three-dimensional television, a personal computer, a home appliance, a laptop computer, a tablet computer, a mobile phone, a smart phone, a personal digital assistant, a portable multimedia player, a digital camera, a music player, a portable game console, a navigation system, etc.

Figure 11:
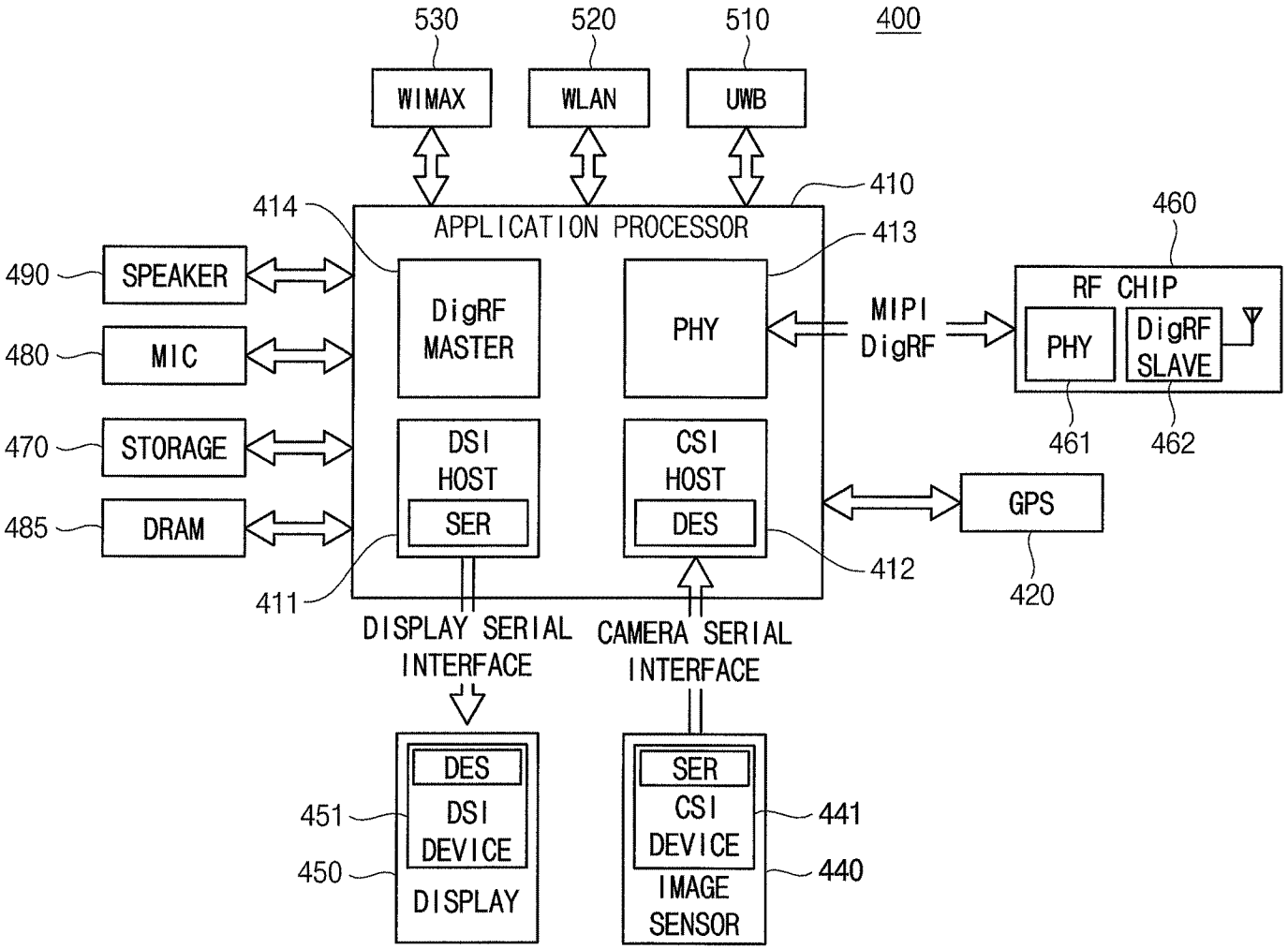
FIG. 11 is a block diagram illustrating a computing system interface according to an exemplary embodiment.

FIG. 11 is a block diagram illustrating a computing system interface according to an exemplary embodiment.

Referring to FIG. 11, a computing system 400 may be implemented by a data processing device that uses or supports a mobile industry processor interface (MIPI) interface. The computing system 400 may include an application processor 410, an image sensor system 440, a display device 450, etc.

A camera serial interface (CSI) host 412 of the application processor 410 may perform a serial communication with a CSI device 441 of the image sensor 440 via a CSI. In some example embodiments, the CSI host 412 may include a deserializer (DES), and the CSI device 441 may include a serializer (SER). A display serial interface (DSI) host 411 of the application processor 410 may perform a serial communication with a DSI device 451 of the display device 450 via a DSI. In some example embodiments, the DSI host 411 may include a serializer (SER), and the DSI device 451 may include a deserializer (DES).

The computing system 400 may further include a radio frequency (RF) chip 460 performing a communication with the application processor 410. A physical layer (PHY) 413 of the computing system 400 and a physical layer (PHY) 461 of the RF chip 460 may perform data communications based on a MIPI DigRF. The application processor 410 may further include a DigRF MASTER 414 that controls the data communications of the PHY 461. The RF chip 460 may further include a DigRF SLAVE 462 that is controlled through the DigRF MASTER 414.

The computing system 400 may further include a global positioning system (GPS) 420, a storage 470, a MIC 480, a DRAM device 485, and a speaker 490. In addition, the computing system 400 may perform communications using an ultra wideband (UWB) 510, a wireless local area network (WLAN) 520, a worldwide interoperability for microwave access (WIMAX) 530, etc. However, the structure and the interface of the computing system 400 are not limited thereto.

The application processor 410 may correspond to the operating part 253 of FIG. 9. The display device 450 may correspond to the display controller 251, the frame buffer 252, the timing controller 240, the display panel 220, the data driver 210 and the scan driver 230.

The above described embodiments may be applied to a display system and an electronic device including the display system. For example, the above described embodiments may be applied to a monitor, a television, a computer, a laptop computer, a digital camera, a mobile phone, a smart phone, a smart pad, a PDA, a PMP, a MP3 player, a navigation system, a camcorder, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

[1. An image processor comprising:

a frame buffer that collects image data of pixels and generates frame data, wherein when the frame data is generated, the frame buffer activates a frame update signal in response to a frame update command and outputs the frame data;

a display controller that generates the frame update command based on a vertical synchronizing signal and a frame per second signal indicating a number per second of frame update signal activations; and a central processing unit (CPU) that generates the vertical synchronizing signal and collects the image data, wherein when the frame per second signal is less than a predetermined threshold value, the CPU identifies a first range of a first frequency at which the CPU operates but does not bound the first frequency by the first range until the frame per second signal equals or exceeds the predetermined threshold value.]

[2. The image processor of claim 1, wherein the CPU varies the first frequency based on a number of instructions processed by the CPU.]

[3. The image processor of claim 1, wherein:

the CPU comprises a frequency controller, a graphic processing unit (GPU) and a multiplexer, the multiplexer outputs first data or second data as the image data based on a control signal, the first data and the control signal being generated by the CPU, and the second data being generated by the GPU, the frequency controller generates a first frequency control signal and a second frequency control signal based on the frame per second signal, and the CPU varies the first frequency according to the first frequency control signal and the GPU varies a second frequency at which the GPU operates according to the second frequency control signal.]

[4. The image processor of claim 3, wherein the frequency controller varies the first frequency control signal based on a number of instructions processed by the CPU and varies the second frequency control signal based on a number of instructions processed by the GPU.]

[5. The image processor of claim 3, wherein the frequency controller establishes a lower limit of the first range based on the second frequency.]

[6. The image processor of claim 5, wherein when the frame per second signal is less than the predetermined threshold value, the lower limit of the first range is set to a predetermined minimum frequency.]

[7. The image processor of claim 3, wherein the multiplexer outputs the first data as the image data when the control signal is activated and outputs the second data as the image data when the control signal is deactivated.]

[8. The image processor of claim 3, wherein the CPU activates the vertical synchronizing signal in a cycle.]

[9. The image processor of claim 8, wherein the cycle is 1/60 second.]

[10. The image processor of claim 1, wherein when the frame update command is applied and the frame data is generated, the frame buffer activates the frame update signal and the display controller increases the frame per second signal.]

[11. The image processor of claim 1, wherein when the frame update command is applied and the frame data is not generated, the frame buffer deactivates the frame update signal and the display controller does not increase the frame per second signal.]

[12. The image processor of claim 1, wherein the first range has a greater lower bound for the first frequency than does a second range which bounds the first frequency at the time the first range is identified.]

[13. A display system comprising:

an image processor that generates frame data and identifies, when a frequency for updating frame data is less than a predetermined threshold, a first range of a first frequency at which the image processor operates but does not bound the first frequency by the first range until the frequency for updating the frame data equals or exceeds the predetermined threshold;

a timing controller that generates a data driver control signal and a scan driver control signal based on the frame data;

a display panel comprising a plurality of pixels;

a data driver that generates a plurality of data signals based on the data driver control signal and outputs the data signals to the pixels through a plurality of data signal lines; and a scan driver that generates a plurality of scan signals based on the scan driver control signal and outputs the scan signals to the pixels through a plurality of scan signal lines.]

[14. The display system of claim 13, wherein the image processor comprises:

a frame buffer that collects image data of pixels and generates the frame data, wherein when the frame data is generated, the frame buffer activates a frame update signal in response to a frame update command and outputs the frame data;

a display controller that generates the frame update command based on a vertical synchronizing signal, a frame per second signal indicating a number per second of frame update signal activations, and the frequency for updating the frame data; and a central processing unit (CPU) that generates the vertical synchronizing signal and the image data.]

[15. The display system of claim 13, wherein the first range has a greater lower bound for the first frequency than does a second range which bounds the first frequency at the time the first range is identified.]

[16. A system comprising:

a Central Processing Unit (CPU) that receives a frame per second signal indicating a number per second of frame update signal activations, operates in response to a first frequency, and generates a vertical synchronizing signal, a control signal, and a first data signal;

a Graphics Processing Unit (GPU) that operates in response to a second frequency and generates a second data signal; and a multiplexer that receives the first data signal, the second data signal, and the control signal and selectively outputs either the first data signal or the second data signal in response to the control signal, wherein:

the CPU comprises:

a frame buffer that activates a frame update signal in response to a frame update command and outputs frame data; and a display controller that generates the frame update command based on the vertical synchronizing signal and the frame per second signal, and when the frame per second signal is less than a predetermined threshold value, the CPU identifies a first range of the first frequency but does not bound the first frequency by the first range until the frame per second signal equals or exceeds the predetermined threshold value.]

[17. The system of claim 16, wherein the second frequency is selected from a plurality of second frequencies and the first frequency falls within a plurality of ranges for the first frequency respectively corresponding to each one of the plurality of second frequencies.]

[18. The system of claim 16, wherein:

the first frequency is based on a number of instructions processed by the CPU, and the second frequency is based on a number of instructions processed by the GPU.]

[19. The system of claim 16, wherein the CPU comprises a frequency controller providing a first frequency control signal to the CPU that defines the first frequency and providing a second frequency control signal to the GPU that defines the second frequency.]

[20. The system of claim 16, wherein the first range has a greater lower bound for the first frequency than does a second range which bounds the first frequency at the time the first range is identified.]

*21. An image processor comprising:*

*a frame buffer that collects image data of pixels and generates frame data,*

*wherein if the frame data is generated, the frame buffer activates a frame update signal and outputs the frame data in response to a frame update command;*

*a display controller that generates the frame update command based on a vertical synchronizing signal and a frame per second signal, wherein the frame per second signal represents a number of activations per second of the frame update signal; and*

*an operating part that generates the vertical synchronizing signal and the image data,*

*wherein the operating part is configured to, based on a first value of the frame per second signal, identify a lower limit of a range of frequency of the operating part as a predetermined minimum frequency, and*

*the operating part is configured to, after identifying the lower limit of the range of frequency as the predetermined minimum frequency, bound the frequency of the operating part by the lower limit based on a second value of the frame per second signal, wherein the second value of the frame per second signal is greater than the first value of the frame per second signal.*

*22. The image processor of claim 21, wherein the first value of the frame per second signal is less than a predetermined threshold value that is determined by a user.*

*23. The image processor of claim 21, wherein the operating part comprises a central processing unit (CPU) comprising a frequency controller, a graphics processing unit (GPU) and a multiplexer,*

*wherein the multiplexer outputs first data and second data as the image data based on a control signal, the first data and the control signal being generated by the CPU, and the second data being generated by the GPU,*

*wherein the frequency controller generates a first frequency control signal and a second frequency control signal based on the frame per second signal, and*

*wherein the CPU adjusts a first frequency according to the first frequency control signal and the GPU adjusts a second frequency according to the second frequency control signal.*

*24. The image processor of claim 22, wherein the frequency controller adjusts the first frequency control signal based on a first number of instructions processed by the CPU, and adjusts the second frequency control signal based on a second number of instructions processed by the GPU.*

*25. The image processor of claim 22, wherein the frequency controller establishes a lower limit of a range of the first frequency based on the second frequency.*

*26. The image processor of claim 22, wherein the multiplexer outputs the first data as the image data when the control signal is activated and outputs the second data as the image data when the control signal is deactivated.*

*27. The image processor of claim 22, wherein the CPU activates the vertical synchronizing signal in a cyclic manner.*

*28. The image processor of claim 27, wherein a cycle of the vertical synchronizing signal activated by the CPU has a period of 1/60 second.*

*29. The image processor of claim 21, wherein when the frame update command is applied and the frame data is*

*generated, the frame buffer activates the frame update signal and the display controller increases the frame per second signal.*

*30. The image processor of claim 21, wherein when the frame update command is applied and the frame data is not generated, the frame buffer deactivates the frame update signal and the display controller does not increase the frame per second signal.*

*31. The image processor of claim 21, wherein the operating part adjusts frequency based on a number of instructions processed by the operating part.*

*32. A system comprising:*

*a Central Processing Unit (CPU) that receives a frame per second signal, operates in response to a first frequency, and generates a vertical synchronizing signal, a control signal, and a first data signal, wherein the frame per second signal represents a number of activations per second of a frame update signal;*

*a Graphics Processing Unit (GPU) that operates in response to a second frequency and generates a second data signal; and*

*a multiplexer that receives the first data signal, the second data signal, and the control signal, and selectively outputs either the first data signal or the second data signal in response to the control signal,*

*wherein the CPU comprises*

*a frame buffer that activates the frame update signal in response to a frame update command and outputs frame data; and*

*a display controller that generates the frame update command based on the vertical synchronizing signal and the frame per second signal,*

*wherein, when the frame per second signal is less than a predetermined threshold value, the CPU sets a lower limit of a range of the first frequency to a predetermined minimum frequency, and*

*when the frame per second signal is greater than or equal to the predetermined threshold value, the CPU initiates the lower limit of the range of the first frequency.*

*33. The system of claim 32, wherein the second frequency is selected from a plurality of second frequencies, and the first frequency falls within a plurality of ranges for the first frequency respectively corresponding to each one of the plurality of second frequencies.*

*34. The system of claim 32, wherein the first frequency is based on a number of instructions processed by the CPU, and the second frequency is based on a number of instructions processed by the GPU.*

*35. The system of claim 32, wherein the CPU comprises a frequency controller providing a first frequency control signal to the CPU that defines the first frequency and providing a second frequency control signal to the GPU that defines the second frequency.*

*36. The system of claim 32, wherein the predetermined threshold value is determined by a user.*

* * * * *